Dec. 2, 1969  E. P. MOSLO  3,480,994
PARISON-TYPE BOTTLE BLOWING MACHINE
Filed May 29, 1967  7 Sheets-Sheet 1

FIG.1

INVENTOR
ERNEST P. MOSLO
BY
Baldwin, Doran & Egan
ATTORNEYS

INVENTOR
ERNEST P. MOSLO

BY
Baldwin, Doran & Egan
ATTORNEYS

Dec. 2, 1969  E. P. MOSLO  3,480,994
PARISON-TYPE BOTTLE BLOWING MACHINE
Filed May 29, 1967  7 Sheets-Sheet 4

FIG.4

INVENTOR
ERNEST P. MOSLO
BY
Baldwin, Doran & Egan
ATTORNEYS

Dec. 2, 1969  E. P. MOSLO  3,480,994

PARISON-TYPE BOTTLE BLOWING MACHINE

Filed May 29, 1967  7 Sheets-Sheet 5

INVENTOR
ERNEST P. MOSLO
BY
Baldwin, Doran & Egan
ATTORNEYS

INVENTOR.
ERNEST P. MOSLO
BY
Baldwin, Doran & Egan
ATTORNEYS

United States Patent Office 3,480,994
Patented Dec. 2, 1969

3,480,994
PARISON-TYPE BOTTLE BLOWING MACHINE
Ernest P. Moslo, 12700 Lake Ave.,
Lakewood, Ohio 44107
Filed May 29, 1967, Ser. No. 641,753
Int. Cl. B29c 5/06
U.S. Cl. 18—5                                                           12 Claims

ABSTRACT OF THE DISCLOSURE

The bottle blowing machine is for producing plastic bottles having indented or recessed bottom walls and comprises movable rear wall mold sections (which rear wall mold sections mold the bottom wall of the bottle) of laterally-disposed blow molds, with power means for moving such rear wall sections, so that a bottle or other hollow plastic article formed in one or the other of the blow molds and having an indented or recessed bottom wall, can be removed vertically from the opened blow mold without interference occurring between the formed article and the rear wall of the mold. Heretofore the bottom wall of the bottle or molded article had to be made generally flat or planar in order to provide for removal of the article vertically with respect to the defining blow mold cavity upon opening of the mold.

---

This invention relates in general to a parison-type of bottle blowing machine, and more particularly to a parison-type bottle blowing machine having blow mold portions with movable rear wall sections, for providing for removal of the molded bottle from the blow mold when the rear or bottom wall of the formed bottle has an indented portion which would ordinarily cause interference between the mold and the formed bottle during removal of the latter from the mold.

In U.S. Patent No. 3,116,516 issued Jan. 7, 1964 to Ernest P. Moslo, there is disclosed a bottle-blowing machine of the parison-type for the automatic production of plastic bottles. The machine of such patent comprises three molds with corresponding mold clamps, positioned side by side with two groups of parison core rods adapted to be selectively disposed within adjacent pairs of the molds, so that when the core rods are disposed in such adjacent molds, the molds may be closed, with the central mold of the group being adapted for injection molding of parisons upon the associated core rods, and the laterally disposed side molds being adapted for blow molding the finished articles. After the blowing operation, the molds are opened and the core rods are raised vertically with respect to the molds, and the finished bottles are ejected from the group of core rods associated with the blow mold.

Heretofore in a machine of the prior art type it has generally been necessary to form the articles or bottles with generally flat bottom walls since a bottom wall having indentations thereon, would interfere with the mold upon opening of the mold for removal of the finished article or bottle from the mold and thus prevent the effective removal of the article.

The present invention provides a parison-type blowing machine in which the bottles or other articles to be formed in the machine have indented bottom walls, and wherein the rear wall sections of the blow mold portions of the machine, which form such indented bottom walls of the bottles, are separately formed from the rest of the mold and are movable so that such rear wall sections may be moved out of interfering relation with the formed bottle, and the mold may be opened so that the formed article may be removed vertically from the open blow mold. Power means coact with the rear wall mold sections for powering the movement thereof, and control means are provided for automatically moving said rear wall sections into molding position upon closure of the blow mold and automatically moving the rear wall sections out of interfering relation with the formed article prior to opening of the mold.

Accordingly, an object of the invention is to provide a parison-type bottle blowing machine of the above type which has an improved arrangement for forming bottles or other articles having indented bottom wall portions.

Another object of the invention is to provide a machine of the aforediscussed type having movable rear wall mold sections for the blow mold portions of the machine so that such rear wall sections can be moved out of interfering relation with the formed article or bottle, to permit opening of the mold and vertical removal of the bottle from the mold without interference.

A further object of the invention is to provide a machine of the latter mentioned type wherein there is provided power means for actuating the movement of the rear wall sections of the blow mold portions and with control means coacting with the power means to automatically move the rear wall sections into position for blow molding upon closure of the associated blow mold portion, and for automatically moving the rear wall section out of interfering relation with the formed bottle or article upon completion of the formation of the bottle or article, and just prior to opening of the mold.

Other objects and advantages of the invention will be apparent from the following description taken in conjunction with the accompanying drawings wherein.

Figure 1:
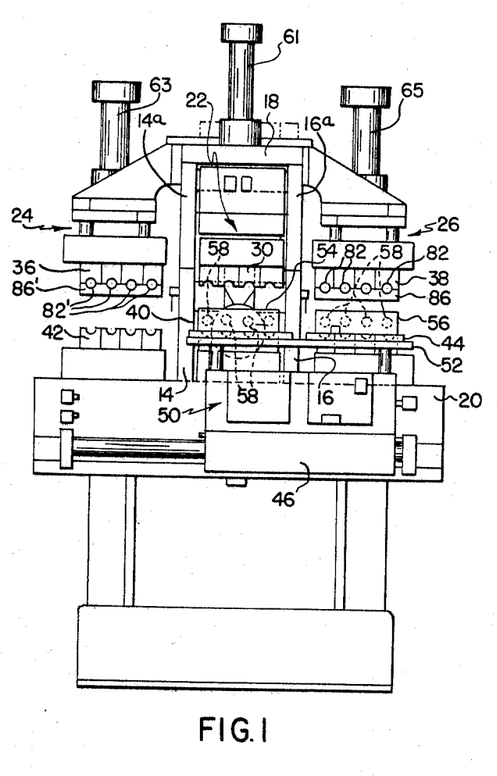
FIGURE 1 is a diagrammatic front elevation of a bottle blowing machine embodying the invention.
Figure 2:
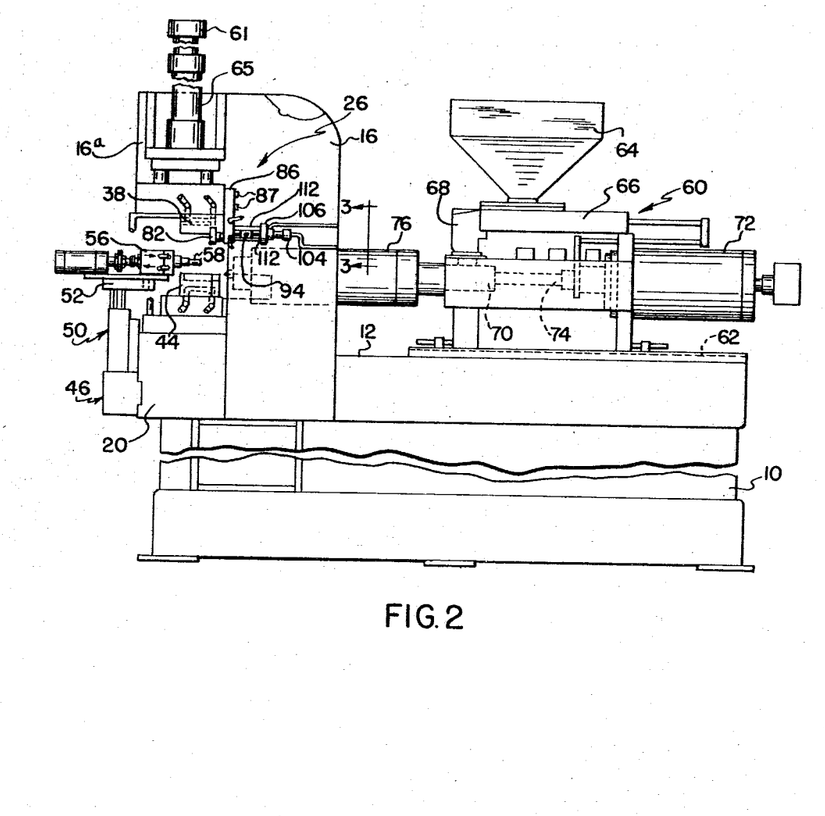
FIGURE 2 is a diagrammatic side elevation of the machine shown in FIGURE 1.
Figure 3:
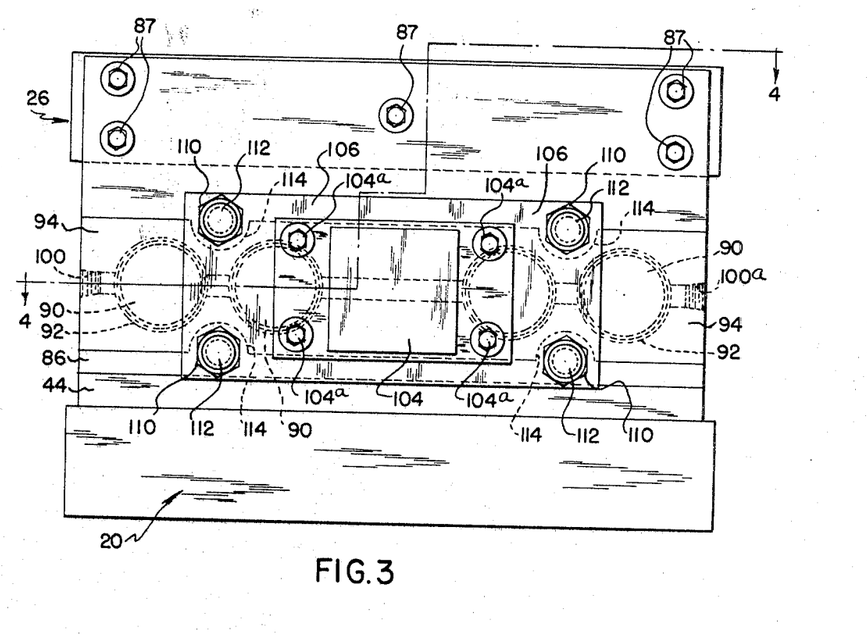
FIGURE 3 is an enlarged rear elevational view of the movable rear wall assembly and is taken generally along the plane of line 3—3 of FIGURE 2 looking in the direction of the arrows.

Referring now again to the drawings the parison-type bottle blowing machine illustrated in FIGURES 1 and 2 comprises a base 10 supporting a bed 12 adjacent the rearward end of the machine. At the forward end of the machine there may be provided generally vertically extending mold clamp supporting members 14 and 16, spaced laterally of either side of the longitudinal vertical center plane of the machine, and connected adjacent the upper ends thereof by means of cross structure 18. A lower mold support base 20 extends transversely of the machine. The forwardly projecting portions 14a and 16a of the supporting members 14 and 16 provide a mounting for a parison mold clamp assembly 22 positioned therebetween. A left blow mold clamp assembly 24 may be mounted on the outer side of supporting member 14, and a right blow mold clamp assembly 26 may be secured to the outer side of support member 16.

The parison mold clamp assembly 22 may include a vertically reciprocal piston and cylinder motor unit 61 adapted to vertically move an upper parison mold half 30. In a similar manner the blow mold clamp assemblies 24 and 26 may include reciprocal cylinder and piston motor units 63 and 65 respectively, for moving vertically the upper blow mold halves 36 and 38 respectively.

The aforementioned support base 20 supports the lower mold halves of respectively the parison mold and the blow molds beneath each of the mold clamp assemblies. The lower parison mold half is designated by reference number 40, and the lower halves of the left and right blow mold portions are designated by respectively reference numbers 42 and 44.

A table shifting assembly 46 may be mounted upon the front side of the support base 20, and is adapted to move laterally between the position shown in FIGURE 1 wherein it is disposed generally adjacent the parison mold portion and the right hand blow mold portion, to a position whereby the assembly 46 would be positioned generally adjacent the parison mold and the left blow mold assembly. The table shifting assembly 46 supports and carries with it in its lateral movement, the parison core rod holder assembly indicated generally at 50.

The core rod holder assembly 50 comprises in general a vertically shiftable table 52 upon which are mounted a pair of laterally spaced core rod holders 54 and 56. In the position of the core rod holders illustrated in FIGURE 1, the core rods 58 associated with the core rod holder 54 are positioned between the parison mold halves 30 and 40, and the core rods associated with the right hand core rod holder 56 are positioned between the right hand blow mold halves 38 and 44. When the table shifting assembly 46 moves all the way to the left from the right hand position illustrated in FIGURE 1, the core rods of the left hand core rod holder 54 would be disposed between the left hand blow mold halves 36 and 42, while simultaneously the core rods of the right hand holder 56 would be disposed between the parison mold halves 30 and 40.

The bed 12 of the machine supports a plastic material injection assembly 60 (FIGURE 2) which, in the embodiment illustrated, is adapted for movement toward and away from the lower parison mold half 40 by means of a slideway 62 mounted on the upper surface of bed 12. Assembly 60 may comprise a hopper 64 into which molding material such as any suitable plastic material is fed, in for instance, a granular state. A material feed mechanism 66 transfers the granular molding material in predetermined amounts forwardly to a funnel mechanism 68 from which it drops into a packing cylinder 70. Rearwardly of the packing cylinder there may be provided an injection cylinder 72 having a forwardly and rearwardly reciprocating or movable ram 74 adapted for propelling the granular molding material in a forward direction into a material heating chamber or plasticizing head 76. The material heating chamber 76 is so positioned adjacent the parison mold and in communication with spaced nozzles at the forward end of the plasticizing head, so that when the parison mold is closed upon the core rods 58, parisons may be injection molded upon the core rods and as disclosed in aforementioned U.S. Patent 3,116,516.

Briefly, the operation of the machine is that with the core rod holders in the position illustrated for instance in FIGURE 1 and with the parison mold 30, 40 and the blow molds 36, 42 and 38, 44 closed, the core rods 58 of holder 54 will be disposed in the parison mold cavities, and the core rods of mold holder 56 will be disposed in the mold cavities of the right hand blow mold 38, 44. In this position parisons are molded upon the core rods by means of the material injection assembly 60, and concurrently with the injection molding in the parison mold halves, bottles are blown in the right hand blow mold from previously formed parisons.

After the bottles have been blown in the right hand blow mold and the parisons have been injected at the centrally disposed parison mold, the molds are opened, with the upper half 36 of the left blow mold being raised by the left blow mold clamp assembly 24, the upper parison mold half 30 raised by the parison mold clamp assembly 22, and the upper half 38 of the right hand blow mold being raised by the right hand blow mold clamp assembly 26. After the molds have opened a short distance, the parison rods 58 are raised vertically by the parison core rod holder assembly 50. When the molds are opened fully, the core rods are disposed generally centrally between the upper and lower mold halves due to the aforementioned raising by the core rod holder assembly, at which point the newly blown bottles on the core rods of the core rod holder 56 are stripped from the associated core rods by means of air pressure in the manner described in aforementioned U.S. Patent 3,116,516.

Both groups of core rods and their associated holders 54 and 56 are then shifted to the left by means of the table shifting assembly 46, whereby the core rods supporting the newly formed parisons are disposed between the left hand blow mold halves 36 and 42 and the core rods of holder 56 from which the completed bottles were previously ejected, are positioned between the upper and lower parison mold halves 30 and 40. The core rods are then lowered into the left hand blow mold and the parison mold by means of the core rod holder assembly 50, after which the molds are closed by the mold clamping assemblies 22, 24 and 26. Bottles are then blown at the left hand blow mold while new parisons are injected at the parison mold. The aforedescribed cycle is then continuously repeated as desired with bottles being alternately blown and ejected at either the left or right hand blow mold, while the parisons are concurrently formed at the center parison mold.

Referring now in particular to FIGURES 3–5B, the bottles or articles 77 (FIGURES 5A and 5B) which are adapted to be produced in the parison bottle blowing machine have indented bottom walls including a recessed central portion 77a and a rearwardly projecting peripheral portion 77b.

The blow molds 36, 42 and 38, 44 in accordance with the present invention are provided with movable rear wall sections 82 so that such rear wall sections may be moved forwardly during blowing of the bottle and then moved rearwardly away from the blown article after completion of the blowing operation, so that the molds may be opened and the core holders and associated core rods may be moved vertically out of the blow mold cavities after opening of the molds, without interference occurring between the rear wall sections of the mold defining the bottom of each of the blown articles, and the article. As can be best seen in FIGURES 3 and 4, the blow molds are illustrated as four cavity molds, but it will be understood of course that any number of mold cavities may be provided.

Such shiftable rear wall sections of the blow molds may be supported on bracket means 86, 86′ which in the embodiment illustrated, are secured as by means of fasteners 87 to the back side of the associated clamping mechanism 26 or 24. Thus in the embodiment illustrated the rear wall mold sections move vertically with the upper half of the associated blow mold. As can be seen from FIGURES 3 to 5, the rear wall mold sections 82 may be of generally circular exterior configuration each defining on the forwardly facing or inner face 88 thereof the configuration for producing the indented central portion of the bottom wall of the bottle, upon blowing of the parison in the blow mold cavity. Section 82 may be detachably secured as by means of threaded shank 89 to mounting member 90 which extends in axially movable relation relative to bearing sleeve 92 mounted on bracket 86 or 86'.

Mounting member 90 extends rearwardly to be supported on and secured to support member 94 and may be secured thereto as by means of threaded shank portion 96 of mounting member 90. A cavity 98 may be provided in support member 94 with sealing means 98a being provided, for providing for the insertion of cooling fluid into the cavity to cool mounting members 90 and thus cool the rear wall mold sections 82. As can be seen best in FIGURE 4 the cooling cavities 98 may be connected to one another by passages 99 for continuous passage of cooling fluid through support member 94, and via inlet and exit ports 100, 100a respectively. Also, brackets 86, 86' may each have passageways 101, 101a (FIGURES 4 and 5) extending therethrough for likewise receiving circulating cooling fluid therein, for aiding in cooling mold sections 82.

Figure 4:
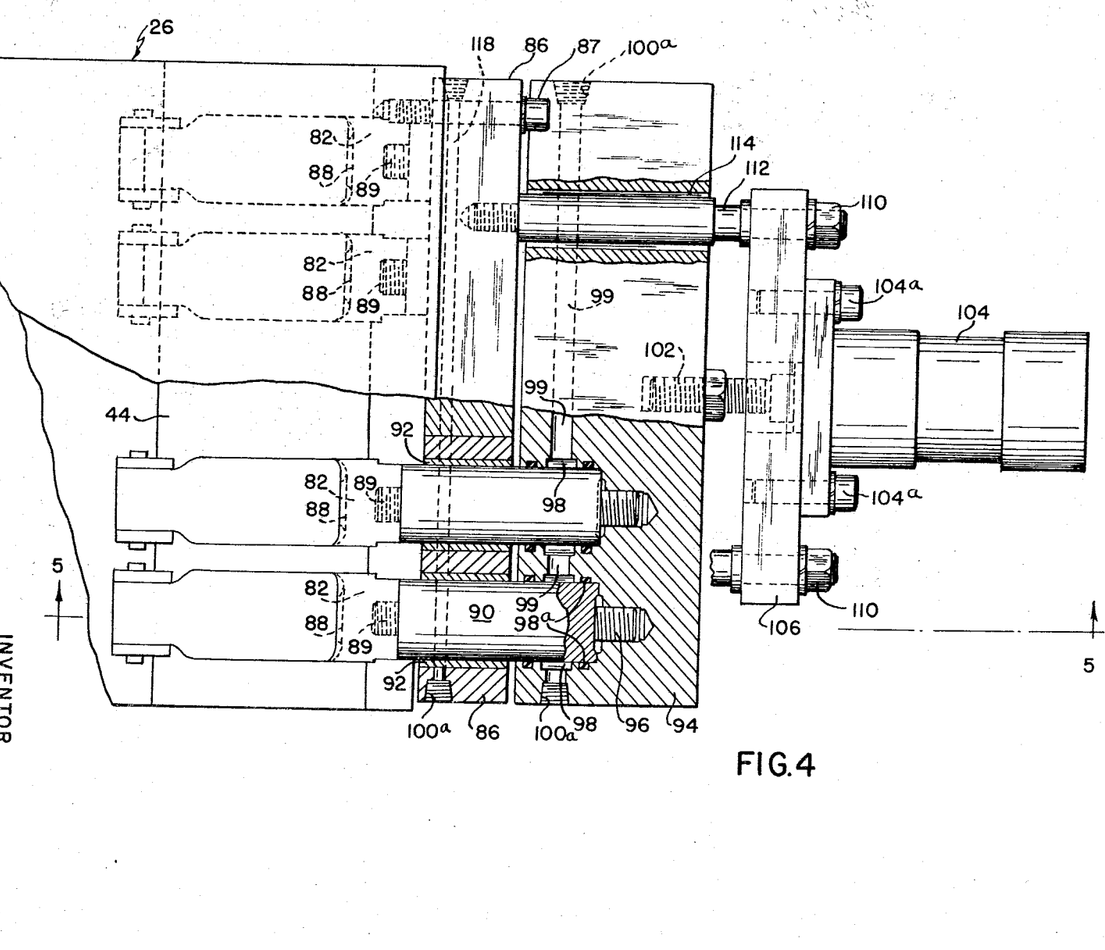
FIGURE 4 is a sectional view taken generally along the plane of line 4—4 of FIGURE 3 looking in the direction of the arrows.
Figure 5:
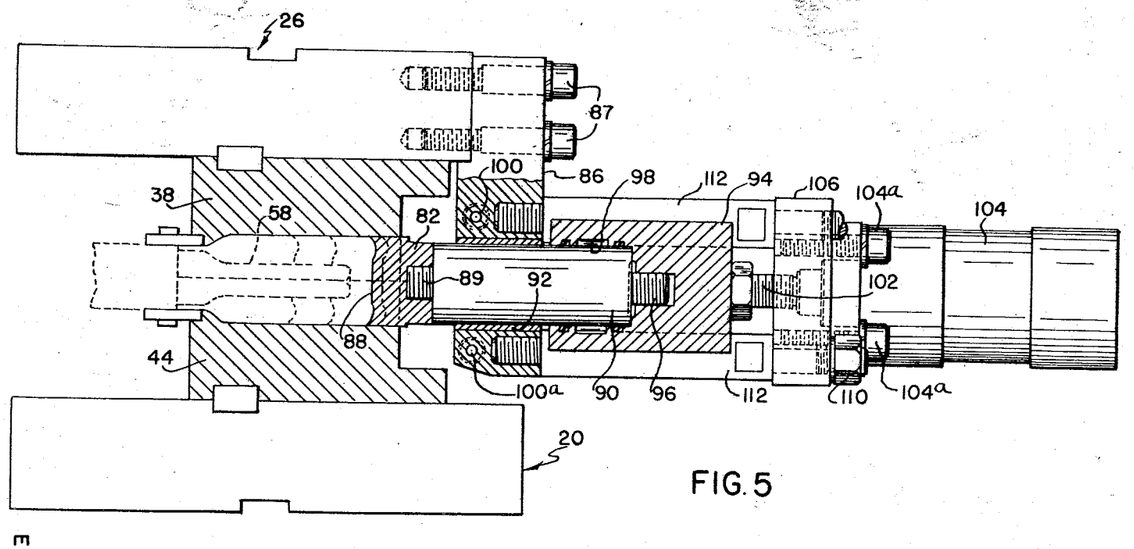
FIGURE 5 is a sectional view taken generally along the plane of line 5—5 of FIGURE 4 looking in the direction of the arrows.
Figure 5A:
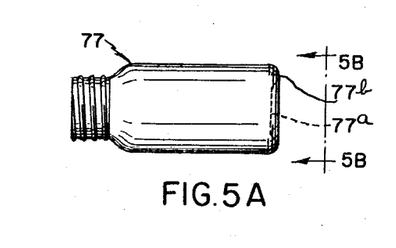
FIGURE 5A is a side elevational view of a bottle as blown in the machine of FIGURES 1 and 2.
Figure 5B:
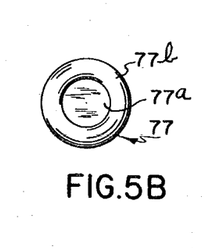
FIGURE 5B is an end elevational view of the bottle taken generally along the plane 5B—5B of FIGURE 5A.

Support member 94, which may be of the generally blocklike configuration shown in FIGURES 4 and 5 may be coupled as by means of threaded piston rod 102 to a reciprocal, double acting, fluid powered piston and cylinder motor unit 104.

Motor unit 104 may be secured as by means of fasteners 104a to a support plate 106. Support rods 112 may extend between the support plate 106 and the bracket 86 and be secured thereto as by nuts 110 for supporting the power unit 104 on the bracket 86. Mounting member 94 may be recessed as at 114 (FIGURE 3) for providing clearance between mounting member 94 and the support rods 112, thus providing for ease of movement of the mounting member 94 with respect to bracket 86 upon actuation of motor unit 104. As can be seen in FIGURE 5, bracket 86 and support plate 106 may limit the movement of the rear wall mold sections 82. By replacing supporting members 90 with different length members, the height or length of the article or bottle formed in the blow mold assembly can be varied, and as shown for instance in FIGURE 5 wherein the phantom lines designate different sizes of bottles with the position of the rear wall mold sections 82 therein, during blowing of such different size bottles. The core rods 58 would, of course, have to be correspondingly changed in length.

The parts for the left hand blow mold assembly and movable rear wall mold sections, are generally identical with those of the right hand assembly illustrated, and wherever shown have been designated by similar numerals as those for the right hand assembly with the prefix prime being applied thereto.

Figure 6:
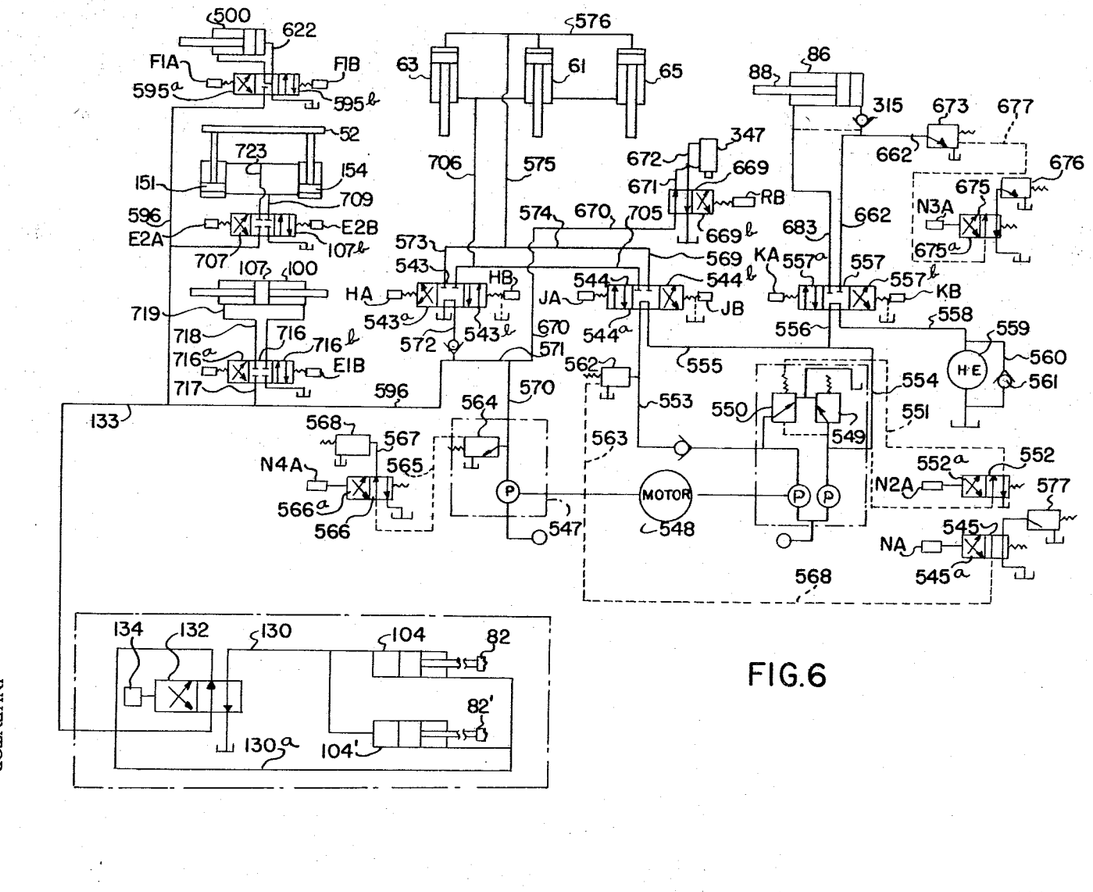
FIGURE 6 is a schematic illustration of the power means for actuating the movable rear wall sections of the blow mold portions together with control means for actuating the power means and as coupled into the hydraulic circuit illustrated in FIGURE 35 of U.S. Patent 3,116,516.
Figure 7:
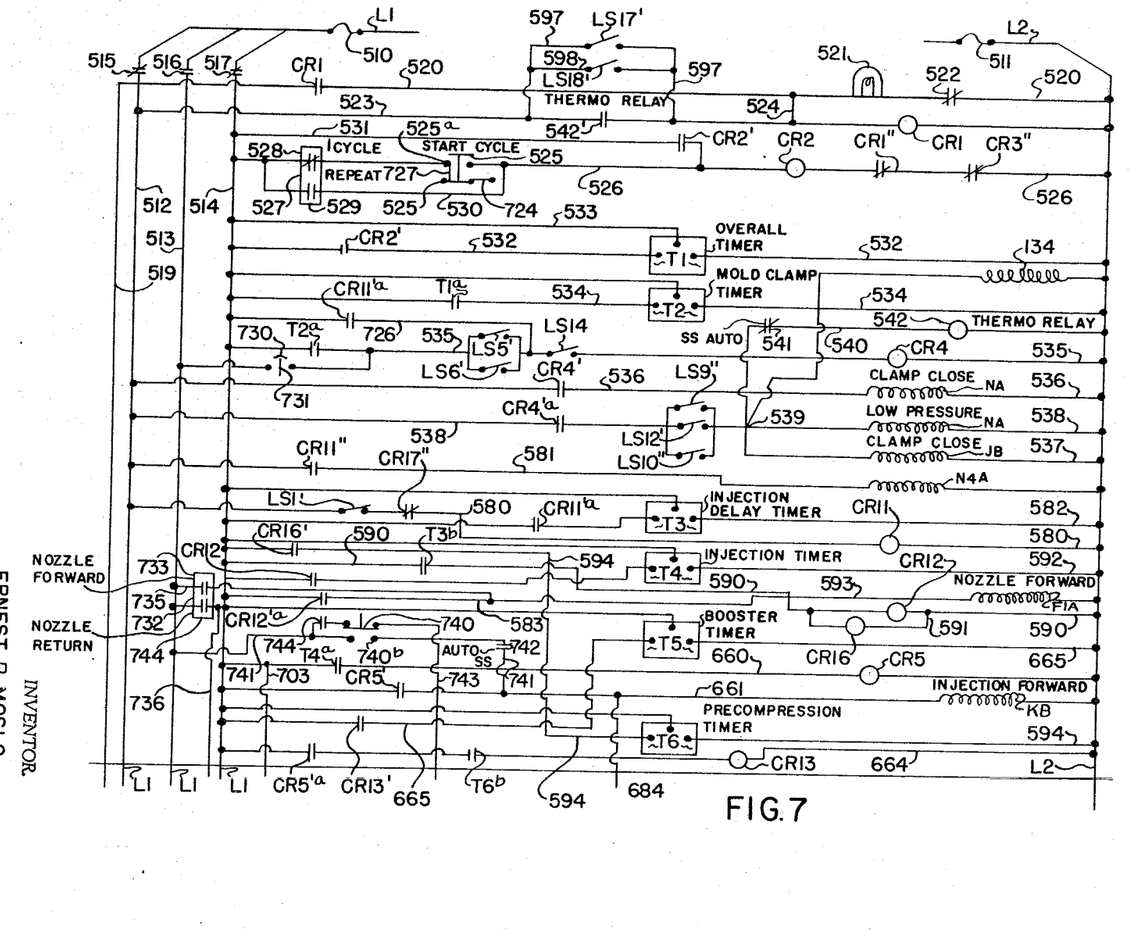
FIGURE 7 is a schematic illustration of control circuitry for automatically controlling the operations of the bottle blowing machine, and is identical to FIGURE 34 of U.S. Patent 3,116,516, except for the addition to the circuitry of control solenoid means for actuating the power means controlling the movement of the rear wall mold sections.

Referring now to FIGURES 6 and 7 the reciprocal motor units 104, 104' which actuate or move the rear wall portions 82, 82' of respectively the right hand blow mold and left hand blow mold, may be coupled by fluid transmission lines 130, 130a to conventional control valve 132 which control valve is solenoid actuated for automatic movement of the rear wall mold sections 82, 82' of the blow molds. Valve 132 may then be coupled as by means of line 133 back into line 596 of the hydraulic system of the machine. FIGURE 6 is identical to FIGURE 35 of aforementioned Patent 3,116,516 except for the addition thereto of the motor units 104, 104', associated fluid transmission lines and solenoid operated control valve 132. Such added components have been enclosed by a phantom lined rectangle for ease in locating such added components.

Line 596 contains pressurized fluid from the low volume pump 547 and therefore may be utilized to actuate the motor units 104, 104'.

The solenoid 134 of valve 132 may be coupled into the control circuit illustrated in FIGURE 7. FIGURE 7 is identical to FIGURE 34 of aforementioned U.S. Patent 3,116,516 except for the addition thereto of solenoid coil 134. The arrangement is such that valve 132 is automatically actuated upon actuation of the mold clamp mechanisms 22, 24 and 26 to close the molds, thus positioning the rear wall mold sections of the blow molds in proper position for molding operations. In this connection the solenoid coil may be coupled in circuit between junction 539 and line L2 as shown in FIGURE 7.

As described in aforementioned Patent 3,116,516, energization of relay CR4 (FIGURE 7) initiates the closing of all of the mold clamps. A low pressure solenoid NA is connected across the line 512 and L2 by means of a conductor 538. Conductor 537 is connected into the line 538 at the junction 539 whereby energy is delivered to the clamp close solenoid JB. The conductor 540 is also connected at one end to the junction 539 and at the other end thereof to the line L2. Conductor 540 has interposed therein contacts 541 which are closed when the contacts 515 and 517 are closed to form the circuit for the automatic cycle. A thermal relay 542 is also connected into the conductor 540 in series with contacts 541.

Circuits to the solenoid HA, NA, and JB are completed by the closing of normally open contacts CR4' and CR4'a (FIGURE 7) in the conductors 536 and 538 respectively, which close in response to the energization of CR4. Solenoid HA is energized directly by the closing of the contact CR4' and the solenoids NA and JB are energized through limit switches LS9, LS10 and LS12. The circuit is connected to the normally closed contact LS9" and LS10" which open when the blow molds close completely. LS12', a normally open pair of contacts, provide the connection through LS12 and are closed during a portion of the closing movement of the parison mold assembly as set forth in U.S. Patent 3,116,516. It will be noted that the limit switch contacts LS9", LS10" and LS12' are connected in parallel in conductor 538 whereby as long as any one of the contacts is closed, both solenoids NA and JB will be energized. Upon energization of solenoids NA and JB, solenoid 134 of valve 132 is also energized thus causing outward movement of the pistons of the left and right hand motor units 104, 104' controlling the positioning of the rear wall mold sections 82, 82' of the blow molds. Thus actuation of the rear wall mold sections 82, 82' to molding position occurs upon closing actuation of the clamping cylinders 61, 63 and 65 of the mold clamps.

Now with the bottles fully blown in the manner aforedescribed in Patent 3,116,516, the mold clamp timer T2 times out (FIGURE 7) thereby opening contacts T2a and deenergizing relay CR4 thereby opening contacts CR4' and CR4'a and deenergizing the clamp close solenoids HA, JB together with deenergization of solenoids 134 of valve 132 of motor units 104 and 104'. Valve members 543 and 544 together with valve member 132 are thereby allowed to return to their normal positions and contacts 72b close (FIGURE 34A U.S. Patent 3,116,-516) to cause energization of solenoids HB and JA, to cause energization of the power units 61, 63 and 65 to retract the latter, thus opening the molds. Return of valve 132 to normal position as aforedescribed, causes energization of the motor units 104, 104' to cause withdrawal of the rear wall portions 82, 82' from coaction with the formed bottles prior to actual opening of the molds.

As described in U.S. Patent 3,116,516, the barrel cam 474 (FIGURE 16 of U.S. Patent 3,116,516) which actuates limit switch LS24 is of such length that LS24 is not released until the mold clamps have opened a predetermined distance, preferably about two inches, after which the operating member 472 rides off barrel cam 474 thereby allowing LS24" to close and complete a circuit to the table up solenoid E2A. Accordingly, it will be seen that movement of the core rods 58 and core rod holders 54, 56 vertically by means of the table up solenoid is not actuated until such time as the rear wall mold sections 82, 82' have been withdrawn from interfering relationship with the formed bottom wall configuration of the blown bottles.

From the aforegoing description and accompanying drawings it will be seen that the invention provides a parison type bottle blowing machine which has movable rear wall mold sections of the blow molds, for production of indented bottom wall type of bottles, so that no interference occurs between the formed bottles and the blow mold during the discharge of the bottles from the mold.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. In a blow molding machine for making hollow articles having an indented configuration of back wall comprising, a central parison mold and a pair of blow molds disposed one on either side of the parison mold, said molds comprising upper and lower halves, said halves being relatively movable with respect to one another for opening and closing the molds, laterally and vertically shiftable means disposed in front of said molds, a pair of core rod means mounted on said shiftable means and laterally spaced so as to be alternately projected between the halves of pairs of adjacent molds, one of which is always said parison mold, said blow molds comprising movable rear wall mold sections for moving said rear wall sections out of interfering relation with the indented back wall of the formed article prior to removal of the formed article from the associated blow mold, and power means for moving said rear wall mold sections.

2. A blow molding machine in accordance with claim 1 wherein said core rod means is sequentially shiftable upwardly, laterally and downwardly by said laterally and vertically shiftable means, and from positions within one lower blow mold half and lower parison mold half, to positions respectively within said lower parison mold half and the other lower blow mold half, each time said molds open.

3. A blow molding machine in accordance with claim 1 wherein said rear wall section comprises a mold cavity defining portion, a mounting portion attached to said cavity defining portion and projecting rearwardly therefrom, said mounting portion being adapted for reciprocal movement with said mold cavity defining portion, a support for said mounting portion, and said power means being coupled to said support portion for moving said support portion and thus moving said mounting and cavity defining portions.

4. A blow molding machine in accordance with claim 1 wherein each rear wall mold section is coupled to one of said halves of the respective blow mold.

5. A blow molding machine in accordance with claim 3 wherein said mounting portion is of cylindrical configuration and has means thereon detachably securing the same to said support portion.

6. A blow molding machine in accordance with claim 1 including means for cooling said rear wall mold sections.

7. A blow molding machine in accordance with claim 3 including means detachably securing said mold cavity defining portion to said mounting portion.

8. A blow molding machine in accordance with claim 3 including a plurality of rear wall mold cavity defining portions coacting with a plurality of mold cavities in said upper and lower halves of each of said blow molds.

9 wherein said control means includes means for automatically actuating said power means to initiate movement of said rear wall mold sections to molding position upon closure of said upper and lower halves of said blow molds.

10. A blow molding machine in accordance with claim 9 wherein said control means includes means for automatically actuating said power means to cause movement of said rear wall mold sections away from the article prior to opening of said molds.

11. A blow molding machine in accordance with claim 9 wherein said control means includes a solenoid operated fluid control valve.

12. In a blow molding machine for molding plastic articles such as bottles having an indented configuration of back wall, comprising a centrally disposed parison mold and two flanking blow molds one of which is disposed on either side of said parison mold, all of said molds comprising upper and lower mold halves, and powered clamp means for opening and closing all of said mold halves together, a pair of core rod means mounted together and projecting respectively between said parison mold halves and the halves of a first blow mold, means for laterally shifting said pair of core rod means whereby they move to a position projecting respectively between said parison mold halves and the halves of a second blow mold, said core rod means being shiftable upwardly, laterally and downwardly from positions within one lower blow mold half and said lower parison mold half to positions respectively within said lower parison mold half and the other lower blow mold half each time said molds open, movable rear wall mold sections for said blow molds whereby said rear wall sections may be moved relative to the remainder of the blow mold halves and out of interfering relation with the article formed in said blow molds, and power means for moving said rear wall mold sections.

References Cited

UNITED STATES PATENTS

| | | | |
|---|---|---|---|
| 2,298,716 | 10/1942 | Moreland et al. | 18—5 X |
| 2,834,154 | 5/1958 | Koob | 18—5 X |
| 3,116,877 | 1/1964 | Moslo | 18—5 X |
| 3,337,667 | 8/1967 | Ninneman | 264—97 |

WILBUR L. McBAY, Primary Examiner

U.S. Cl. X.R.

264—97

UNITED STATES PATENT OFFICE
CERTIFICATE OF CORRECTION

Patent No. 3,480,994　　　　　　　　　　　　December 2, 1969

Ernest P. Moslo

It is certified that error appears in the above identified patent and that said Letters Patent are hereby corrected as shown below:

Column 8, line 11, "9 wherein said control means includes means for auto-" should read -- 9. A blow molding machine in accordance with claim --.

Signed and sealed this 3rd day of November 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents